(12) United States Patent
Jesurajan Marystella et al.

(10) Patent No.: US 10,135,840 B2
(45) Date of Patent: Nov. 20, 2018

(54) SYSTEM AND METHOD FOR SPEED DIALING INFORMATION HANDLING SYSTEM CONFIGURATION CHANGES

(71) Applicant: Dell Products L.P., Round Rock, TX (US)

(72) Inventors: Anto DolphinJose Jesurajan Marystella, Round Rock, TX (US); Cyril Jose, Austin, TX (US); Marshal F. Savage, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 124 days.

(21) Appl. No.: 15/211,320

(22) Filed: Jul. 15, 2016

(65) Prior Publication Data

US 2018/0020007 A1    Jan. 18, 2018

(51) Int. Cl.
*H04L 29/06* (2006.01)
*H04L 9/32* (2006.01)
*G06F 9/4401* (2018.01)
*H04L 9/08* (2006.01)

(52) U.S. Cl.
CPC .......... *H04L 63/123* (2013.01); *G06F 9/4416* (2013.01); *H04L 9/3247* (2013.01); *H04L 9/0863* (2013.01)

(58) Field of Classification Search
None
See application file for complete search history.

(56) References Cited

U.S. PATENT DOCUMENTS

| | | | | |
|---|---|---|---|---|
| 5,903,653 A * | 5/1999 | Ross | ............ | B60R 25/042 380/271 |
| 6,253,193 B1 * | 6/2001 | Ginter | ............ | G06F 21/10 348/E5.006 |
| 6,816,871 B2 * | 11/2004 | Lee | ............ | G06F 21/6218 |
| 6,947,556 B1 * | 9/2005 | Matyas, Jr. | ...... | G06F 21/6209 380/281 |
| 7,681,034 B1 * | 3/2010 | Lee | ............ | G06F 21/6218 705/51 |
| 7,921,288 B1 * | 4/2011 | Hildebrand | ...... | H04L 63/04 713/165 |
| 2003/0011758 A1 * | 1/2003 | Ochiai | .......... | G06F 21/32 356/71 |

(Continued)

OTHER PUBLICATIONS

Freesoft, "Connected: An Internet Encyclopedia Ip Packet Structure", found at www.freesoft.org/CIE/Course/Section3/7.htm, 2/6.*

*Primary Examiner* — Piotr Poltorak
(74) *Attorney, Agent, or Firm* — Baker Botts L.L.P.

(57) ABSTRACT

Methods and systems for receiving speed dial configuration changes may involve receiving a packet, determining whether the packet is associated with a valid command, determining whether a username in a header of the packet is a valid user, validating a signature using a public key, decrypting encrypted data using a first factor key, and executing the valid command associated with the decrypted data. The packet includes the header, encrypted data, and the signature, and is sent without a one-to-many management console and without prior group configuration. The validation of the signature may be based on the determination that the packet is associated with a valid command and that the username in the header of the packet is a valid user.

17 Claims, 4 Drawing Sheets

(56) References Cited

U.S. PATENT DOCUMENTS

| | | | | |
|---|---|---|---|---|
| 2004/0044625 A1* | 3/2004 | Sakamura | G06F 21/10 | 705/41 |
| 2004/0049670 A1* | 3/2004 | Miyamoto | G06F 9/4416 | 713/2 |
| 2005/0273843 A1* | 12/2005 | Shigeeda | H04L 9/3213 | 726/5 |
| 2006/0029261 A1* | 2/2006 | Hoffman | G06Q 20/12 | 382/115 |
| 2006/0053488 A1* | 3/2006 | Sinclair | H04L 63/102 | 726/22 |
| 2006/0069787 A1* | 3/2006 | Sinclair | G06F 17/3089 | 709/229 |
| 2006/0085498 A1* | 4/2006 | Matsushima | H04L 67/16 | 709/202 |
| 2006/0282681 A1* | 12/2006 | Scheidt | G06F 21/602 | 713/186 |
| 2008/0148042 A1* | 6/2008 | Brown | H04L 63/0442 | 713/154 |
| 2010/0110945 A1* | 5/2010 | Koskela | H04W 48/20 | 370/310 |
| 2010/0306566 A1* | 12/2010 | Dehaan | G06F 1/3203 | 713/330 |
| 2010/0313019 A1* | 12/2010 | Joubert | G06F 21/313 | 713/168 |
| 2011/0219141 A1* | 9/2011 | Coile | H04L 29/08549 | 709/235 |
| 2011/0239308 A1* | 9/2011 | Fuchs | G06F 9/526 | 726/30 |
| 2012/0096185 A1* | 4/2012 | Naparstek | H04L 41/145 | 709/246 |
| 2012/0155349 A1* | 6/2012 | Bajic | H04W 4/008 | 370/311 |
| 2015/0213259 A1* | 7/2015 | Du | H04L 63/1466 | 726/27 |
| 2015/0222436 A1* | 8/2015 | Morten | G07C 9/00571 | 713/176 |
| 2016/0048460 A1* | 2/2016 | Kadi | G06F 12/1408 | 713/193 |
| 2016/0232360 A1* | 8/2016 | Lu | H04L 9/0891 | |
| 2016/0253520 A1* | 9/2016 | Moon | G06F 21/72 | 713/190 |
| 2017/0272427 A1* | 9/2017 | Robison | H04L 63/0861 | |

* cited by examiner

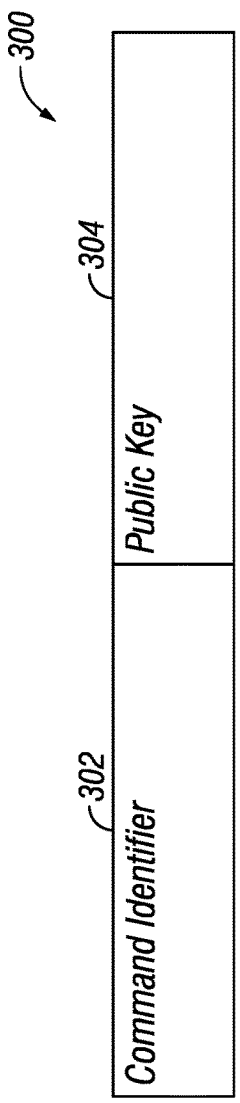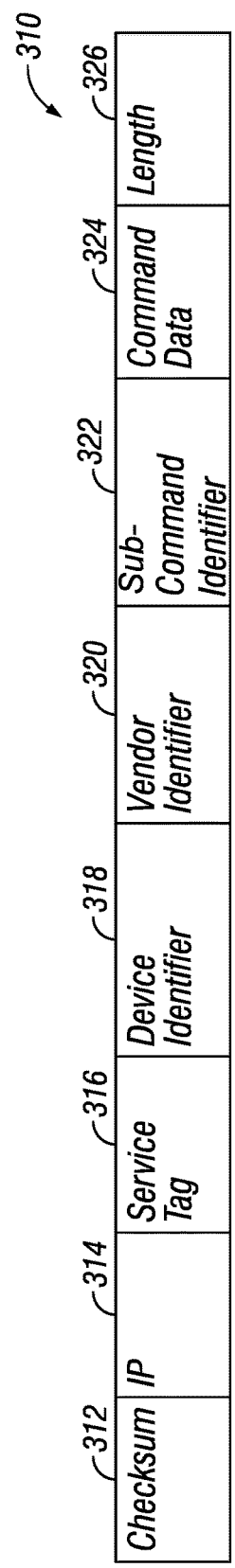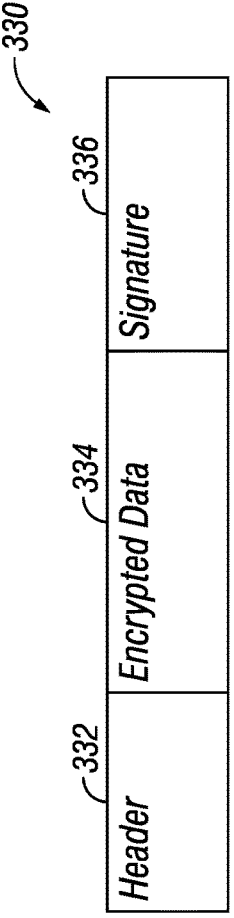
FIG. 3A
FIG. 3B
FIG. 3C

SYSTEM AND METHOD FOR SPEED DIALING INFORMATION HANDLING SYSTEM CONFIGURATION CHANGES

BACKGROUND

Field of the Disclosure

This disclosure relates generally to information handling systems and more particularly to systems and methods for speed dialing configuration changes.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The use of management controllers in information handling systems has increased in recent years. Broadly speaking, a management controller may be a device, system, or apparatus for remote monitoring or management of an information handling system. A management controller may be enabled to use a so-called 'out-of-band' network interface that is physically isolated from an 'in-band' network interface used generally for non-management communications. The management controller may include, or be an integral part of, a baseboard management controller (BMC), a Dell Remote Access Controller (DRAC), or an Integrated Dell Remote Access Controller (iDRAC). The management controller may be a secondary information handling system embedded in the information handling system. The management controller may communicate using a one-to-many management console.

SUMMARY

A secondary information handling system may be used to speed dial verified and secured configuration changes between nodes in a distributed computing group. A user account may exist on a plurality secondary information handling systems to form a logical group. The speed dial command may enable the secondary information handling system to communicate to the group without a prior group configuration and without the use of a one-to-many management console. The commands may be encrypted and secured using a two-factor method, and may be sent to the distributed computing group using an IPv4 subnet broadcast or an IPv6 local network multicast.

In one aspect, a disclosed method for receiving speed dial configuration changes may include receiving a packet sent without a one-to-many management console and without prior group configuration, determining whether the packet may be associated with a valid command, determining whether a username in a header of the packet may be a valid user, validating a signature of the packet using a public key based on the determination that the packet may be associated with a valid command and that the username in the header of the packet may be a valid user, decrypting encrypted data from the packet using a first factor key, and executing the valid command associated with the decrypted data. The packet may include a header, encrypted data, and a signature.

In certain embodiments, the method may include a first factor key that may be derived using a username and password. The valid command may include at least one of a power-down command, a power-up command, a firmware updated command, a PXE boot command, a power capacity command, a power supply command, and/or a fan speed command. The determination whether the packet is associated with a valid command may include comparing a command identifier in the header of the packet to a whitelist of commands. The valid command may include a command identifier and command data extracted from the decrypted data. In certain embodiments, the method may include verifying a checksum in the decrypted data and verifying a length value in the decrypted data by comparing a length of the decrypted data to the length value. In certain embodiments, the method may include determining whether the packet targets a device based on a device identifier in the decrypted data and executing the valid command for the targeted device based on the determination that the decrypted data targets a device.

Another disclosed aspect includes an information handling system, comprising a processor subsystem having access to a first memory, and a management controller comprising a secondary processor having access to a second memory, the second memory including an embedded storage partition and the second memory storing instructions executable by the secondary processor.

A further disclosed aspect includes a management controller for an information handling system having a primary processor and a primary memory, the management controller comprising a secondary processor having access to a second memory, the second memory including an embedded storage partition and the second memory storing instructions executable by the secondary processor.

An additional disclosed aspect includes an article of manufacture comprising a non-transitory computer-readable medium storing instructions executable by a secondary processor, while an information handling system comprises a processor subsystem and the second processor.

BRIEF DESCRIPTION OF THE DRAWINGS

For a more complete understanding of the present invention and its features and advantages, reference is now made to the following description, taken in conjunction with the accompanying drawings, in which:

FIG. 3A is a block diagram of a header for a speed dial command, in accordance with some embodiments the present disclosure;

FIG. 3B is a block diagram of data for a speed dial command, in accordance with some embodiments of the present disclosure;

FIG. 3C is a block diagram of a packet for speed dialing configuration changes, in accordance with some embodiments of the present disclosure;

DESCRIPTION OF PARTICULAR EMBODIMENT(S)

Figure 1:
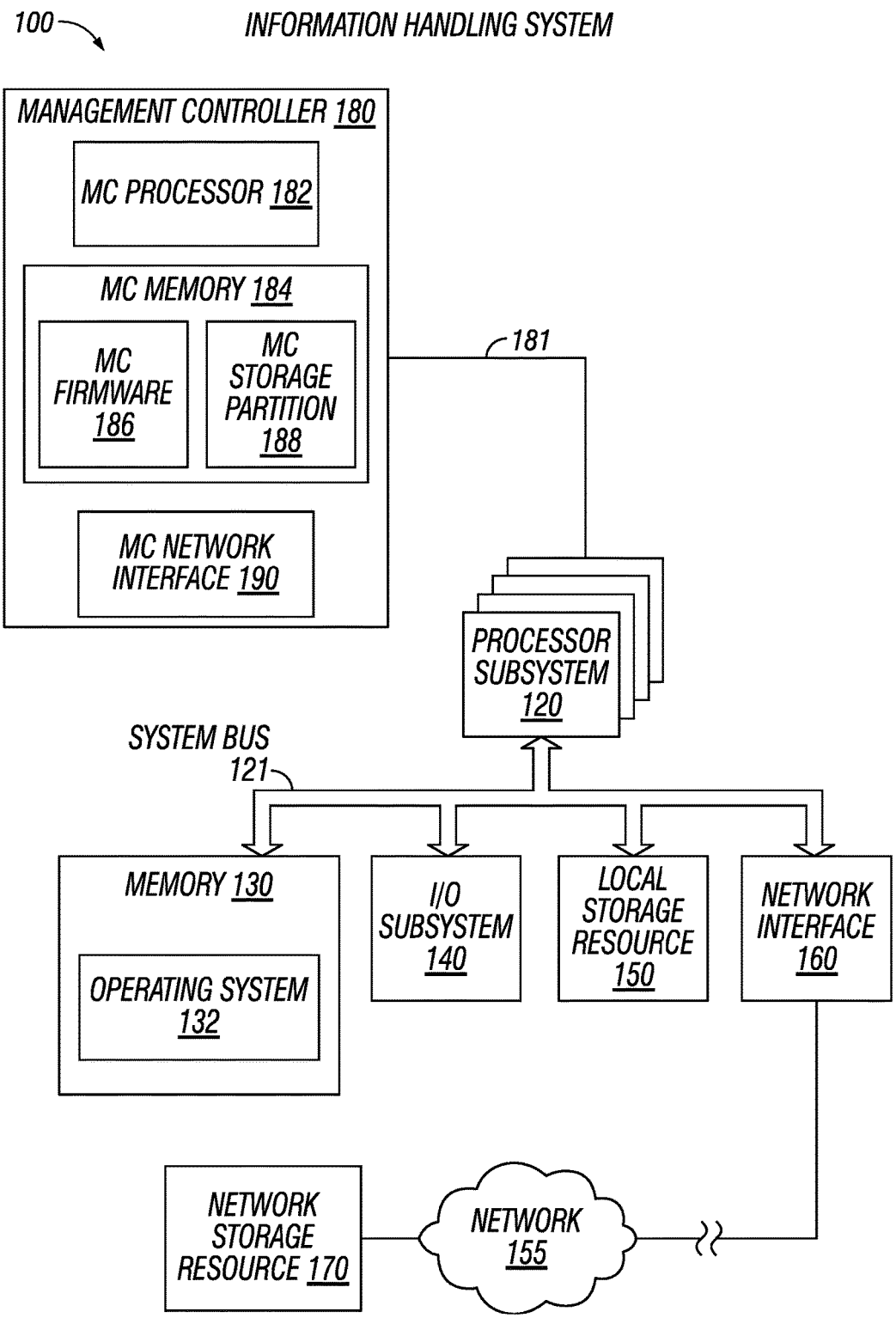
FIG. 1 is a block diagram of selected elements of an information handling system for speed dialing configuration changes, in accordance with some embodiments of the present disclosure.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Additionally, the information handling system may include firmware for controlling and/or communicating with, for example, hard drives, network circuitry, memory devices, I/O devices, and other peripheral devices. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-4 wherein like numbers are used to indicate like and corresponding parts.

Turning now to the drawings, FIG. 1 illustrates a block diagram depicting selected elements of an embodiment of information handling system 100 for managing distributed group identity. Also shown with information handling system 100 are external or remote elements, namely, network 155 and network storage resource 170.

As shown in FIG. 1, components of information handling system 100 may include, but are not limited to, processor subsystem 120, which may comprise one or more processors, and system bus 121 that communicatively couples various system components to processor subsystem 120 including, for example, memory 130, I/O subsystem 140, local storage resource 150, and network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network 155. Network interface 160 may enable information handling system 100 to communicate over network 155 using a suitable transmission protocol and/or standard, including, but not limited to, transmission protocols and/or standards enumerated below with respect to the discussion of network 155. In some embodiments, network interface 160 may be communicatively coupled via network 155 to network storage resource 170. Network 155 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network 155 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 155 and its various components may be implemented using hardware, software, or any combination thereof. In certain embodiments, information handling system 100 and network 155 may be included in a rack domain.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory 130 and/or another component of physical hardware 102). In the same or alternative embodiments, processor subsystem 120 may interpret and/or execute program instructions and/or process data stored remotely (e.g., in a network storage resource).

Also in FIG. 1, memory 130 may comprise a system, device, or apparatus operable to retain and/or retrieve program instructions and/or data for a period of time (e.g., computer-readable media). As shown in the example embodiment of FIG. 1, memory 130 stores operating system 132, which may represent instructions executable by processor subsystem 120 to operate information handling system 100 after booting. It is noted that in different embodiments, operating system 132 may be stored at network storage resource 170 and may be accessed by processor subsystem 120 via network 155 Memory 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as information handling system 100, is powered down.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. For example, local storage resource 150 may store executable code in the form of program files that may be loaded into memory 130 for execution, such as operating system 132. In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. For example, I/O subsystem 140 may include a Peripheral Component Interconnect Express (PCI-E) interface that is supported by processor subsystem 120. In certain embodiments, I/O subsystem 140 may comprise a touch panel and/or a display adapter. The touch panel (not shown) may include circuitry for enabling touch functionality in conjunction with a display (not shown) that is driven by display adapter (not shown).

Also shown in FIG. 1 is management controller (MC) 180, which may include MC processor 182 as a second processor included with information handling system 100 for certain management tasks. MC 180 may interface with processor subsystem 120 using any suitable communication link 181 including, but not limited to, a direct interface with a platform controller hub, a system bus, and a network interface. The system bus may be system bus 121, which may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus. The network interface may be network interface 160 and/or network interface 190. The platform controller hub may provide additional functionality for the processor subsystem 120. The platform controller hub may be internal or external to a processor in processor subsystem 120. The direct interface may be any suitable interface to enable communications, including but not limited to Direct Media Interface (DMI) or PCI-Express.

MC processor 182 may have access to MC memory 184, which may store MC firmware 186, representing instructions executable by MC processor 182. Also shown stored in MC memory 184 is MC storage partition 188, which may represent an embedded storage partition for management controller 180. MC firmware 186 may represent pre-boot instructions executable by MC processor 182, for example, for preparing information handling system 100 to boot by activating various hardware components in preparation of launching operating system 132 for execution (also referred to as a basic input/output system (BIOS)). In certain embodiments, MC firmware 186 includes a Unified Extensible Firmware Interface (UEFI) according to a specification promulgated by the UEFI Forum (uefi.org). Also included with management controller 180 is MC network interface 190, which may be a secondary network interface to network interface 160. MC network interface 190 may provide "out-of-band" network access to management controller 180, for example, even when network interface 160 is unavailable. Thus, management controller 180 may execute MC firmware 186 on MC processor 182 and use MC network interface 190 even when other components in information handling system 100 are inoperable. It is noted that, in certain embodiments, management controller 180 may represent an instance of iDRAC while MC firmware 186 may include a lifecycle controller, which may assist in a variety of functions including, but not limited to, monitoring, updating, maintaining, testing, and deploying one or more components for an information handling system.

The management controller may send and receive speed dialed configuration changes. The speed dial communication may use two-factor authentication and/or encryption using a first factor symmetric key and an asymmetric key set for a signature. The asymmetric key may be pre-provisioned for speed dialing purposes. The private key of the asymmetric key set may be used to sign the message and the public key of the asymmetric key set may be used to validate a signature.

The management controller may maintain a whitelist of commands supported for speed dialing. If a command received does not match an entry on the whitelist, the management controller may disregard or ignore the command. For example, an information handling system without fans may not support a speed dial command to set the fan speed. If the management controller for the information handling system received a speed dial command to set the fan speed, it would ignore the command and continue operation without any change in configuration. Alternatively, the management controller may maintain a blacklist of commands not supported for speed dialing. If the command received matches an entry on the blacklist, the management controller may disregard or ignore the command.

Speed dialing may use a user account shared among a logical group of secondary information handling systems, which may be a group of management controllers. The group may send and receive speed dialed commands without any prior group configuration and without any master of the group. Moreover, the communication between the members of the group may occur using an IPv4 subnet broadcast command or an IPv6 local network multicast command. The use of these commands may enable speed dialed commands to be sent without the use of a one-to-many management console.

The management controller may interface with an information handling system, which may be mobile or portable, to extend the send and receive capability. The interface may use Near Field Communication (NFC), Bluetooth, or wireless LAN. Thus, the information handling system may interface with the management controller, and then the management controller may itself issue the speed dial command. The extension may operate without any prior group configuration by using the same shared user account among the logical group of information handling systems.

Figure 2:
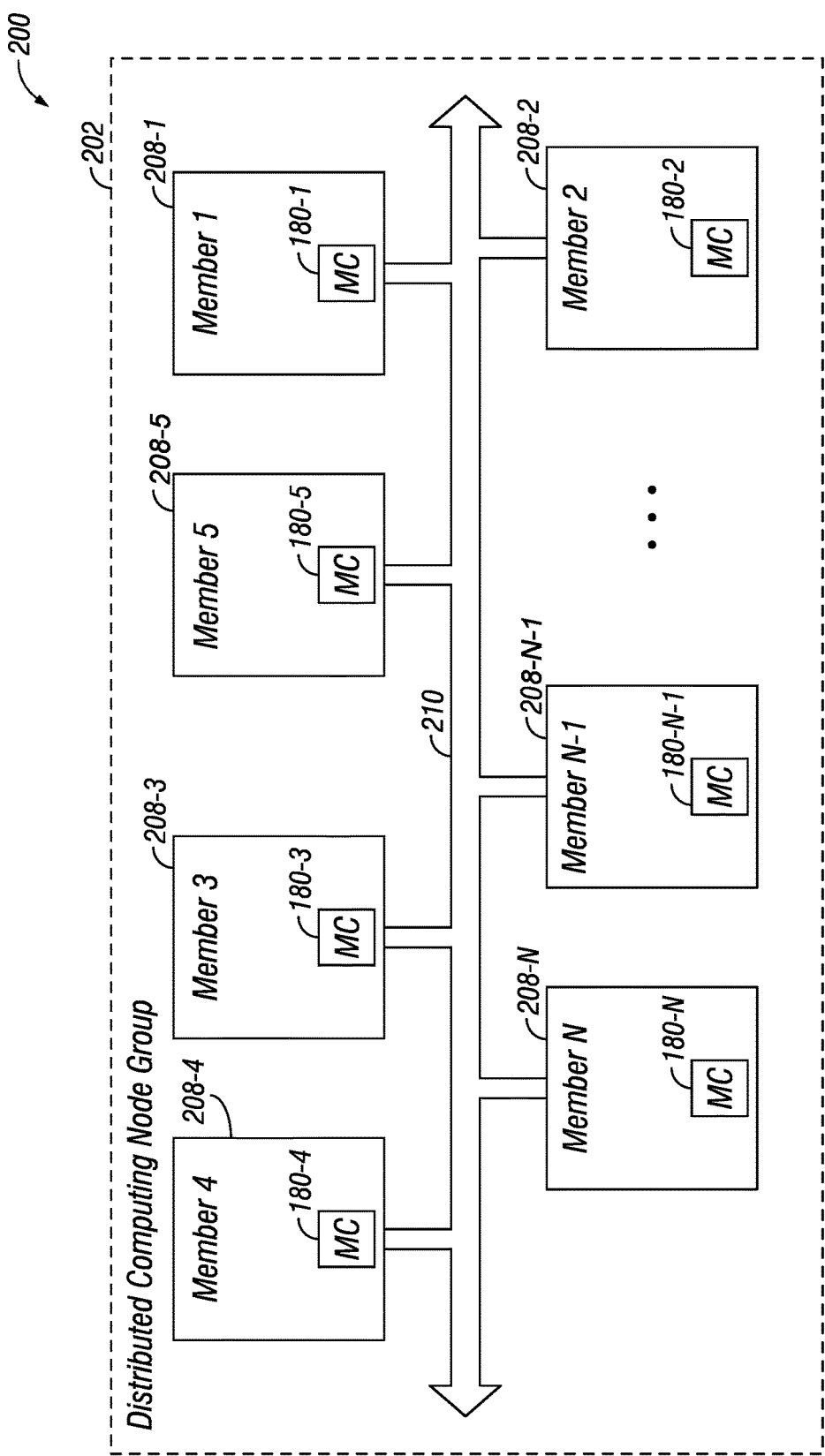
FIG. 2 is a block diagram of selected elements of a distributed computing node group for speed dialing configuration changes, in accordance with some embodiments the present disclosure.

Referring now to FIG. 2, a block diagram of selected elements of a distributed computing node group 202 for speed dialing configuration changes is shown in accordance with some embodiments of the present disclosure. An information handling system or plurality of information handling systems 200 may be grouped together to form a distributed computing node group 202. Group 202 may include a plurality of members 208 connected together with a messaging channel 210. Although group 202 is shown with seven members, group 202 may include any number of members suitable to form a distributed computing node group.

Each member 208 may include a management controller 180 to manage group communications. Members 208 and/or management controllers 180 may use a messaging channel 210 to send and receive messages to each other. The messages may be unencrypted, encrypted, signed, or unsigned. Messaging channel 210 may include any suitable interface between management controllers, including but not limited to a network interface, such as Ethernet, and an I/O interface, such as PCI-E. Group 202 may use secure messaging to improve the security of communications between members 208. Although group 202 may include one or more masters, which may control and/or manage group 202, distributed computing nodes may issue speed dialing commands with or without the establishment of a group or a master. This may enable support for speed dialing without any prior group configuration.

Referring now to FIG. 3A, a block diagram of a header 300 for a speed dial command is shown in accordance with some embodiments the present disclosure. Header 300 may include a command identifier 302 and a public key 304. The command identifier may correspond to the type of configuration change for the speed dial command. The type of configuration changes supported may include any change suitable for group changes including, but not limited to, powering down the information handling system, powering up the information handling system, performing a firmware update on the primary and/or secondary information handling systems, configuring a PXE boot, modifying a power capacity number for the information handling system, switching back a power supply after a migration, and setting fan speeds for the information handling system. The power capacity number may be modified to remove the power capacity limitation, to reduce the power capacity permitted, or to increase the power capacity permitted. For example, a power capacity speed dial command may reduce the power capacity limit for the information handling system by 10%. The public key 304 may correspond to the public key for the user account forming a logical group of management controllers, and may include the user name associated with the user account.

Referring now to FIG. 3B, a block diagram of data 310 for a speed dial command is shown in accordance with some embodiments of the present disclosure. The data 310 may include a plurality of identifiers, including but not limited to a service tag 316, device identifier 318, vendor identifier 320, and sub-command identifier 322. The service tag 316 may correspond to a number assigned to the information handling system for a service or maintenance contract. The device identifier 318 and vendor identifier 320 may uniquely identify the target for execution of the command, such as a particular device or vendor within the information handling system. The sub-command identifier 322 may identify the speed dial command. Data 310 may also include an IP address 314 for the command. The IP address may direct the command to broadcast or multicast to the logical group. Data 310 may be verified for integrity using a checksum 312 and a length 326. The checksum 312 may ensure that the data has not been corrupted or modified. The length 326 may ensure that the data is not lengthened or shortened, and may facilitate parsing of the command.

Referring now to FIG. 3C, a block diagram of a packet 330 for speed dialing configuration changes is shown in accordance with some embodiments of the present disclosure. The packet 330 may include a header 332, encrypted data 334, and a signature 336. Header 332 may be header 300 in whole or in part. For example, header 332 may include internet protocol (IP) data packet header information, such as a source IP address. Encrypted data 334 may represent data 310 after it is encrypted using a first factor key. The first factor key may be derived from the username and password associated with the user account shared among the logical group. Signature 336 may ensure that the user initiated the command, rather than a malicious third-party, which may ensure the integrity of the message while in transmit over a public or private network. Signature 336, which may be a fixed length, may be generated using a private key corresponding to a public key. The asymmetric key pair may be pre-provisioned for speed dialing to avoid prior group configuration.

Figures 4A, 4B:
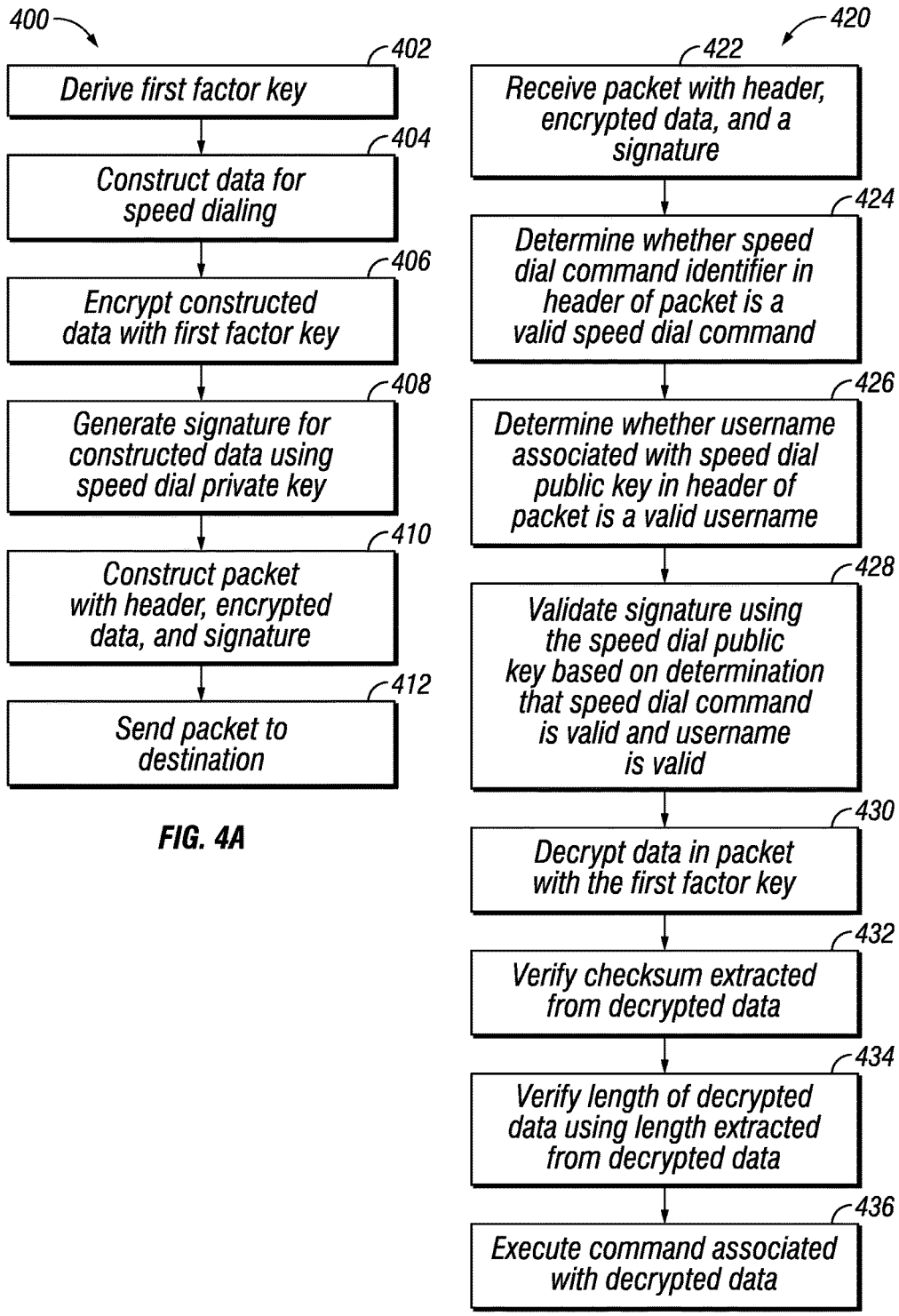
FIG. 4A is a flow chart depicting selected elements of a method for sending a speed dial command, in accordance with some embodiments of the present disclosure.
FIG. 4B is a flow chart depicting selected elements of a method for receiving a speed dial command, in accordance with some embodiments of the present disclosure.

Referring now to FIG. 4A, a flow chart depicting selected elements of a method for sending a speed dial command is shown in accordance with some embodiments of the present disclosure. Method 400 may be implemented by any of the elements shown in FIGS. 1-3. Method 400 may be initiated by any suitable criteria and may initiate operation at any suitable point. In one embodiment, method 400 may initiate operation at 402. Method 400 may include greater or fewer steps than those illustrated. Moreover, method 400 may execute its steps in an order that is different than those illustrated below. Method 400 may terminate at any suitable step. Moreover, method 400 may repeat operation at any suitable step. Portions of method 400 may be performed in parallel and repeat with respect to other portions of method 400.

At 402, a first factor key may be derived. The derivation may be based on a hashing algorithm, such as the Advanced Encryption Standard (AES) algorithm. The username and password associated with the user account shared among the logical group of secondary information handling systems may be used in the derivation process to create a uniquely derived first factor key. At 404, the data for speed dialing may be constructed. The data 310 may include a checksum 312, an IP address 314, a service tag 316, a device identifier 318, a vendor identifier 320, a sub-command identifier 322, command data 324, and/or a length 326. The length may represent the number of bits or bytes present in data 310. The checksum may represent a unique mathematical representation of data 310. Any suitable type of checksum may be used including, but not limited to, a parity checksum, an MD5 checksum, an SHA-1 checksum, and an SHA-2 checksum.

At 406, the data to send 310 may be encrypted with the first factor key. Encryption may involve any suitable encryption algorithm, including but not limited to AES encryption. At 408, a signature may be generated for the constructed data using a speed dial private key. The signature may be used to validate the integrity of the message and to validate the source of the speed dial command. The speed dial private key may be pre-provisioned for speed dialing purposes. In one embodiment, the speed dial public and private key may be based on the username and password of the user with access to the members of a logical group, in which user associated with the username and password has access to each member. In another embodiment, the speed dial public and private key may be shared for all users and may correspond to a particular version of the MC firmware 186.

At 410, a packet may be constructed with header 332, encrypted data 334, and signature 336. The header may include speed dial command identifier 302 and a public key 304 for verifying the signature. Public key 304 may include the speed dial public key and/or the username associated with the key. At 412, the packet may be sent without the use of a one-to-many management console and without any prior group configuration. A one-to-many management console would handle communicating with a plurality of receivers. Prior group configuration may include any suitable configuration for the group, including but not limited to setting a group identifier and determining which information handling systems may join the group. The packet may be broadcast to an IPv4 subnet or multicast to an IPv6 local network. Only members of the logical group corresponding to the shared user account may be able to decrypt the encrypted data within the packet.

Referring now to FIG. 4B, a flow chart depicting selected elements of a method for receiving a speed dial command is shown in accordance with some embodiments of the present disclosure. Method 420 may be implemented by any of the elements shown in FIGS. 1-3 and may correspond to certain elements shown in FIG. 4A. Method 420 may be initiated by any suitable criteria and may initiate operation at any suitable point. In one embodiment, method 420 may initiate operation at 422. Method 420 may include greater or fewer steps than those illustrated. Moreover, method 420 may execute its steps in an order that is different than those illustrated below. Method 420 may terminate at any suitable step. Moreover, method 420 may repeat operation at any suitable step. Portions of method 420 may be performed in parallel and repeat with respect to other portions of method 420.

At 422, the packet may be received with header 332, encrypted data 334, and signature 336. At 424, it may be determined whether the speed dial command identifier in the header of the packet is a valid speed dial command. In one embodiment, the receiver may maintain a whitelist of commands supported, in which the speed dial command identifier may be compared to the whitelist of commands to find a match. The speed dial command may be ignored if a match is not found. At 426, it may be determined whether the username in the header of the packet is a valid user for the receiver. If the username is not a valid user or username for the receiver, the packet may be discarded. If the username is a valid user for the receiver, method 420 may proceed to method step 428. At 428, the signature in the packet may be validated using the speed dial public key based on the determination that the speed dial command is valid and that the username is valid. In one embodiment, the speed dial public key may be pre-provisioned and the receiver may store the speed dial public key locally. In another embodiment, the speed dial public key may be in the received packet.

At 430, the data in the packet may be decrypted using a first factor key derived from a username and password associated with the user account as described in method step 402 above. At 432, a checksum may be extracted from the decrypted data and may be verified. The checksum may be any suitable type of unique mathematical representation for the data including, but not limited to, a parity checksum, an MD5 checksum, an SHA-1 checksum, and an SHA-2 checksum. The checksum may ensure that the data was not modified and/or corrupted. At 434, the length of the decrypted data may be extracted from the decrypted data and may be verified. At 436, the command associated with the decrypted data may be executed. Execution of the command may require extraction of a service tag 316, device identifier 318, vendor identifier 320, sub-command identifier 322, and/or command data 324. The result of the command execution may be a configuration change to an information handling system.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for receiving speed dial configuration changes, comprising:
   receiving a packet sent to a group without a one-to-many management console and without prior configuration of the group, wherein the packet includes a header, encrypted data, and a signature;
   determining whether the packet is associated with a valid command;
   determining whether a username in the header of the packet is a valid user;
   validating the signature of the packet using a public key based on the determination that the packet is associated with a valid command and that the username in the header of the packet is a valid user;
   decrypting the encrypted data from the packet using a first factor symmetric key wherein the first factor symmetric key was derived using the username and a password; and
   executing the valid command associated with the decrypted data.

2. The method of claim 1, wherein the valid command includes at least one of:
   a power-down command;
   a power-up command;
   a firmware update command;
   a PXE boot command;
   a power capacity command;

a power supply command; and a fan speed command.

3. The method of claim 1, wherein determining whether the packet is associated with a valid command further comprises comparing a command identifier in the header of the packet to a whitelist of commands.

4. The method of claim 1, wherein the valid command includes a command identifier and command data extracted from the decrypted data.

5. The method of claim 1, further comprising:

verifying a checksum in the decrypted data; and verifying a length value in the decrypted data by comparing a length of the decrypted data to the length value.

6. An information handling system, comprising:

a processor subsystem comprising a primary hardware processor having access to a first memory;

a management controller comprising a secondary hardware processor having access to a second memory, the second memory including an embedded storage partition and the second memory storing instructions executable by the secondary hardware processor to:

receive a packet sent to a group without a one-to-many management console and without prior configuration of the group, wherein the packet includes a header, encrypted data, and a signature;

determine whether the packet is associated with a valid command; determine whether a username in the header of the packet is a valid user;

validate the signature of the packet using a public key based on the determination that the packet is associated with a valid command and that the username in the header of the packet is a valid user;

decrypt the encrypted data from the packet using a first factor symmetric key wherein the first factor symmetric key was derived using the username and a password; and execute the valid command associated with the decrypted data.

7. The information handling system of claim 6, wherein the valid command includes at least one of:

a power-down command;

a power-up command;

a firmware update command;

a PXE boot command;

a power capacity command;

a power supply command; and a fan speed command.

8. The information handling system of claim 6, wherein the instructions to determine whether the packet is associated with a valid command further comprises instructions to compare a command identifier in the header of the packet to a whitelist of commands.

9. The information handling system of claim 6, wherein the valid command includes a command identifier and command data extracted from the decrypted data.

10. The information handling system of claim 6, further comprising instructions executable by the secondary hardware processor to:

verify a checksum in the decrypted data; and verify a length value in the decrypted data by comparing a length of the decrypted data to the length value.

11. The information handling system of claim 6, further comprising instructions executable by the secondary hardware processor to determine whether the packet targets a device in the information handling system based on a device identifier in the decrypted data and execution of the valid command further comprising execution of the valid command for the targeted device based on the determination that the decrypted data targets a device.

12. A management controller for an information handling system having a primary hardware processor and a primary memory, the management controller comprising:

a secondary hardware processor having access to a second memory, the second memory including an embedded storage partition and the second memory storing instructions executable by the secondary hardware processor to:

receive a packet sent to a group without a one-to-many management console and without prior configuration of the group, wherein the packet includes a header, encrypted data, and a signature;

determine whether the packet is associated with a valid command; determine whether a username in the header of the packet is a valid user; validate the signature of the packet using a public key based on the determination that the packet is associated with a valid command and that the username in the header of the packet is a valid user;

decrypt the encrypted data from the packet using a first factor symmetric key wherein the first factor symmetric key was derived using the username and a password; and execute the valid command associated with the decrypted data.

13. The management controller of claim 12, wherein the valid speed dial command includes at least one of:

a power-down command;

a power-up command;

a firmware update command;

a PXE boot command;

a power capacity command;

a power supply command; and a fan speed command.

14. The management controller of claim 12, wherein the instructions to determine whether the packet is associated with a valid command further comprises instructions to compare a command identifier in the header of the packet to a whitelist of commands.

15. The management controller of claim 12, wherein the valid command includes a command identifier and command data extracted from the decrypted data.

16. The management controller of claim 12, further comprising instructions executable by the secondary hardware processor to:

verify a checksum in the decrypted data; and verify a length value in the decrypted data by comparing a length of the decrypted data to the length value.

17. The management controller of claim 12, further comprising instructions executable by the secondary hardware processor to determine whether the packet targets a device of the information handling system based on a device identifier in the decrypted data and execution of the valid command further comprising execution of the valid command for the targeted device based on the determination that the decrypted data targets a device.

* * * * *